(12) United States Patent
Morimoto

(10) Patent No.: US 7,518,807 B2
(45) Date of Patent: Apr. 14, 2009

(54) FOCUS ADJUSTMENT APPARATUS, IMAGE PICKUP APPARATUS, AND CONTROL METHOD

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 11/846,415

(22) Filed: Aug. 28, 2007

(65) Prior Publication Data

US 2008/0055751 A1    Mar. 6, 2008

(30) Foreign Application Priority Data

Sep. 1, 2006    (JP)    ............................. 2006-237588

(51) Int. Cl.
G02B 15/14    (2006.01)
G02B 7/02    (2006.01)
G03B 3/10    (2006.01)

(52) U.S. Cl. ....................... 359/696; 359/698; 359/823; 396/95

(58) Field of Classification Search ......... 359/694–701, 359/819–824; 396/74, 95, 310; 348/345, 348/349
See application file for complete search history.

(56) References Cited

U.S. PATENT DOCUMENTS 4,974,005 A * 11/1990 Izumi et al. ................. 396/130

2007/0127138 A1* 6/2007 Nakahara ..................... 359/694

FOREIGN PATENT DOCUMENTS

JP    05-064056 A    3/1993

* cited by examiner

*Primary Examiner*—Mohammed Hasan
(74) *Attorney, Agent, or Firm*—Canon U.S.A., Inc. I.P. Division

(57) ABSTRACT

A focus adjustment apparatus comprises a moving unit configured to move a focusing lens, a focus adjusting unit configured to move the focusing lens such that the sharpness of an image obtained from an image pickup unit picking up an object image is increased, and an in-focus position measuring unit configured to measure an in-focus position in a different manner from the focus adjusting unit. The focus adjusting unit moves the focusing lens to the in-focus position measured by the in-focus position measuring unit when a direction of movement of the focusing lens in which the image sharpness is increased is matched with the direction of a current position of the focusing lens relative to the in-focus position measured by the in-focus position measuring unit, and does not move the focusing lens to the measured in-focus position when both the directions are not matched with each other.

5 Claims, 7 Drawing Sheets

FOCUS ADJUSTMENT APPARATUS, IMAGE PICKUP APPARATUS, AND CONTROL METHOD

BACKGROUND OF THE INVENTION

1. Field of the Invention

The present invention relates to a focus adjustment technique used in various types of image pickup apparatuses.

2. Description of the Related Art

Recently, autofocusing devices for video cameras have been predominantly the TV-AF type in which focus adjustment is performed as follows. Image sharpness is detected as an AF evaluation value from an image signal obtained through photoelectric conversion of an object image by using an image pickup device, for example, and a focusing lens position is controlled so that the AF evaluation value is maximized.

The AF evaluation value used in the TV-AF type is generally given as a level of a high-frequency component in an image signal extracted by a band-pass filter allowing passage of a certain band. Stated another way, as shown in FIG. 7, when an ordinary object image is picked up, the AF evaluation value is increased as a focusing lens approaches an in-focus position, and it is maximized at the in-focus position.

As another AF technique, there is known an internal phase-difference detection technique used in many single-lens reflex cameras. With the internal phase-difference detection technique, a light beam having passed through the exit pupil of an imaging lens is divided into two parts, and two divided light beams are received by sets of focus detection sensors, respectively. A deviation between signals output depending on quantities of the received light beams, i.e., a relative positional deviation in the dividing direction of the light beam, is detected. Based on the detected deviation, a deviation of the imaging lens in the focusing direction is determined directly. In other words, by performing a data accumulation operation once with the aid of the focus detection sensors, the amount and the direction of a focal deviation can be obtained and a focus adjustment operation can be realized with high speed.

As another type of phase-difference detection technique, there is also known an external phase-difference detection technique in which a distance sensor is disposed independently of an imaging lens. With the external phase-difference detection technique, a light beam received from an object is divided into two parts, and two divided light beams are received by sets of focus detection sensors, respectively. A deviation between signals output depending on quantities of the received light beams, i.e., a relative positional deviation in the dividing direction of the light beam, is detected. Based on the detected deviation, an object distance is determined by triangular surveying. Other examples of the AF technique using an external distance sensor include the type measuring a propagation speed by using an ultrasonic sensor, and the type performing triangular surveying by using an infrared sensor, which is employed in many compact cameras.

Further, there is known an autofocusing technique which is a combination of the above-mentioned autofocusing techniques. In one example, after moving the focusing lens to the vicinity of an in-focus position according to the internal phase-difference detection technique, a mode is changed to the TV-AF technique for further approaching to the in-focus position. (See Japanese Patent Laid-Open No. 5-64056 (page 4 and FIG. 1)).

However, the above-described known techniques have the following disadvantages. Generally, the in-focus position obtained by the technique other than the TV-AF type differs from an in-focus position obtained by the TV-AF technique. Also, an image pickup area where focus detection is performed by the TV-AF technique is not always matched with an area on an image plane, which is detected by the phase-difference detection technique described above. Therefore, different in-focus positions are calculated for the same object in some cases by the TV-AF technique and the phase-difference detection technique. When the plural AF techniques provide different in-focus positions in such a case, a blur is caused if the focusing lens is improperly moved to the in-focus position obtained by the phase-difference detection technique in spite of that the focusing lens is held at the in-focus position obtained by the TV-AF technique. Another undesired operation may also occur, for example, hunting such that the focusing lens repeats reciprocal movements between the different in-focus positions.

SUMMARY OF THE INVENTION

According to one aspect of the present invention, there is provided a focus adjustment apparatus comprising a moving unit configured to move a focusing lens, a focus adjusting unit configured to perform focus adjustment by moving the focusing lens such that the sharpness of an image obtained from an image pickup unit is increased, and an in-focus position measuring unit configured to measure an in-focus position in a different manner from the focus adjusting unit, wherein the focus adjusting unit moves the focusing lens in the direction of the in-focus position measured by the in-focus position measuring unit when the direction of movement of the focusing lens in which image sharpness is increased is matched with the direction of the current position of the focusing lens relative to the in-focus position measured by the in-focus position measuring unit, and either does not move the focusing lens in the direction of the in-focus position measured by the in-focus position measuring means, or does not move the lens all the way to the in-focus position measured by the in-focus position measuring means, when both directions are not matched with each other.

According to another aspect of the present invention, there is provided an image pickup apparatus comprising the above-mentioned focus adjustment apparatus, and an image pickup unit configured to pick up an object image.

According to still another aspect of the present invention, there is provided an control method for a focus adjustment apparatus including a moving unit configured to move a focusing lens, a focus adjusting unit configured to perform focus adjustment by moving the focusing lens such that sharpness of an image obtained from an image pickup unit picking up an object image is increased, and an in-focus position measuring unit configured to measure an in-focus position in a different manner from the focus adjusting unit, the control method including the steps of moving the focusing lens to the in-focus position measured by the in-focus position measuring unit if the direction of movement of the focusing lens in which image sharpness is increased is matched with the direction of the current position of the focusing lens relative to the in-focus position measured by the in-focus position measuring unit, and not moving the focusing lens to the in-focus position measured by the in-focus position measuring unit when both the directions are not matched with each other.

Further features of the present invention will become apparent from the following description of exemplary embodiments with reference to the attached drawings.

According to the autofocusing technique with the above-described features, the focusing lens can avoid unnecessary movement, thus preventing the occurrence of blurring or hunting.

DESCRIPTION OF THE EMBODIMENTS

Embodiments of the present invention will now be described with reference to attached drawings. Each embodiment described below will be helpful in understanding a variety of concepts from the generic to the more specific.

It should be noted that the technical scope of the present invention is defined by the claims, and is not limited by each embodiment described below.

First Embodiment

Figure 1:
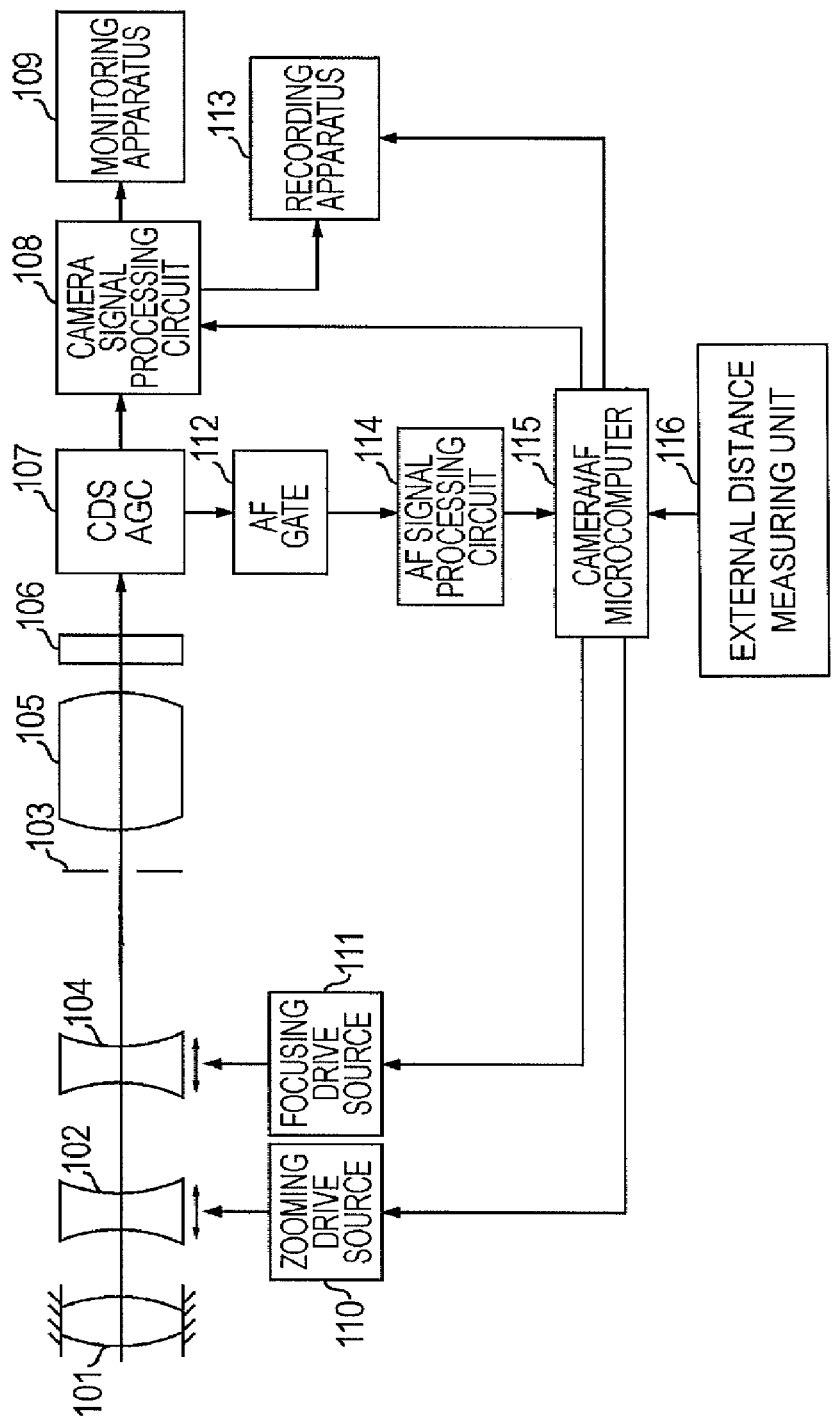
FIG. 1 is a block diagram of a video camera according to a first embodiment of the present invention.

FIG. 1 shows the construction of an image pickup apparatus (a video camera) according to a first embodiment of the present invention. The video camera includes a stationary first unit lens 101, a zoom lens 102 for zooming, an aperture 103, a stationary second unit lens 104, and a focusing-compensating lens (hereinafter referred to as a "focusing lens") 105 which compensates for movements of the focal plane caused by zooming and also has a focusing function. The video camera further includes an image pickup device (CCD) 106, and a CDS/AGC 107 for sampling an output of the CCD 106 and adjusting the gain. Further, a camera signal processing circuit 108 processes the output signal from the CDS/AGC 107 into a signal adapted for a recording apparatus 113. The recording apparatus 113 can be constituted by a magnetic tape, an optical disk, a magnetic disk, a semiconductor memory, or the like.

A motor 110 serves as a drive means for moving the zoom lens 102. A motor 111 serves as a drive means for moving the focusing lens 105. An AF gate 112 allows passage of a signal in the output signal from the CDS/AGC 107, which is used for focus detection. An AF evaluation-value (or AF signal) processing circuit 114 extracts a high-frequency component from the signal having passed through the AF gate 112. A camera AF microcomputer 115 controls the motor 111 for driving the focusing lens 105 in accordance with an output signal from the AF evaluation-value processing circuit 114, and it also outputs an image recording command to the recording apparatus 113. A monitoring apparatus 109 displays an output signal from the camera signal processing circuit 108 and is used by a camera user to monitor an image. In response to the operation of a zoom switch, the camera AF microcomputer 115 controls the zoom lens 102 and the focusing lens 105. Further, an external distance measuring unit 116 is provided in the form of, for example, an external phase-difference detection sensor, an ultrasonic sensor, or an infrared sensor which can be the same as one used in the related art.

AF control executed by the camera AF microcomputer 115 will now be described in detail with reference to FIGS. 2-5.

An AF operation is first described with reference to FIG. 2. In Step 201, processing is started. Step 202 represents AF control using the TV-AF technique. Details of this step will be described later with reference to FIG. 3. In Step 203, an object distance detected by the external distance measuring unit 116 is obtained, and a focusing lens in-focus position based on a phase difference, which corresponds to the object distance, is calculated.

In Step 204, a focus shift-amount threshold is set which is used to determine whether the focusing lens is to be moved to the focusing lens in-focus position based on the phase difference. It is desired that the focus shift-amount threshold be variable depending on the zooming position. This is because, in the case of a rear focusing lens system, the difference of the focusing lens in-focus position corresponding to a difference in the object distance changes depending on the focal length. For example, the difference in the focusing lens in-focus position between an object distance of 1 m and an infinite object distance is increased as the focal length approaches the telephoto side. It is here assumed, for example, that the focus shift-amount threshold is set to a value at which a change of the object distance is reliably determined on the telephoto side based on information obtained from the phase difference in consideration of focusing accuracy attributable to the phase difference. In such a case, if the same setting value is also used on the wide-angle side, the same focus shift amount cannot be obtained unless a change of the object distance is larger than the difference from 1 m to the infinite. Therefore, proper determination cannot be made, and the AF operation based on the phase difference fails to work on the wide-angle side.

In Step 205, the difference between the focusing lens in-focus position based on the phase difference, which is obtained in Step 203, and the current lens position is compared with the focus shift-amount threshold set in Step 204. If the focus shift amount is larger than the threshold, the processing advances to Step 206. On the other hand, if the focus shift amount is smaller than the threshold, the processing is returned to Step 202 to continue the TV-AF operation. The reason why the focusing lens is not moved immediately to the focusing lens in-focus position based on the phase difference is to prevent blurring or hunting which may be caused due to the difference of the in-focus position between the TV-AF technique and the other AF technique when the focusing lens is moved unnecessarily.

In Step 206, it is determined whether the focusing lens in-focus position based on the phase difference is located in the same direction, with respect to the current lens position, as the direction in which the focusing lens is moved by the TV-AF control operation at that time. If the focusing lens is moved in the direction in which the current AF evaluation value is increased in the TV-AF control, it is determined that the focusing lens in-focus position is located in that direction. If both the focusing lens in-focus positions obtained by the phase difference control and the TV-AF control are located in the same direction, the focusing lens is moved to the focusing lens in-focus position based on the phase difference in Step 207. If the movement of the focusing lens is completed, the processing is returned to Step 202 to perform control for further approaching to the in-focus position by the TV-AF technique. This is because, as described above, the TV-AF technique has higher focusing accuracy.

On the other hand, if it is determined in Step 206 that both the focusing lens in-focus positions are not located in the same direction, the focusing lens is not moved to the focusing lens in-focus position based on the phase difference. The processing is returned to Step 202 to continue the focusing control with the TV-AF operation.

Thus, the focus adjustment operation (i.e., whether the focusing lens is moved to the focusing lens in-focus position based on the phase difference) is changed in accordance with the result of comparing, in Step 206, the direction of movement of the focusing lens toward the focusing lens in-focus position based on the phase difference and the direction of driving of the focusing lens in the TV-AF control. Accordingly, unnecessary movement of the focusing lens to the focusing lens in-focus position based on the phase difference can be avoided, and the AF operation causing image blurring or hunting can be prevented.

Figure 3:
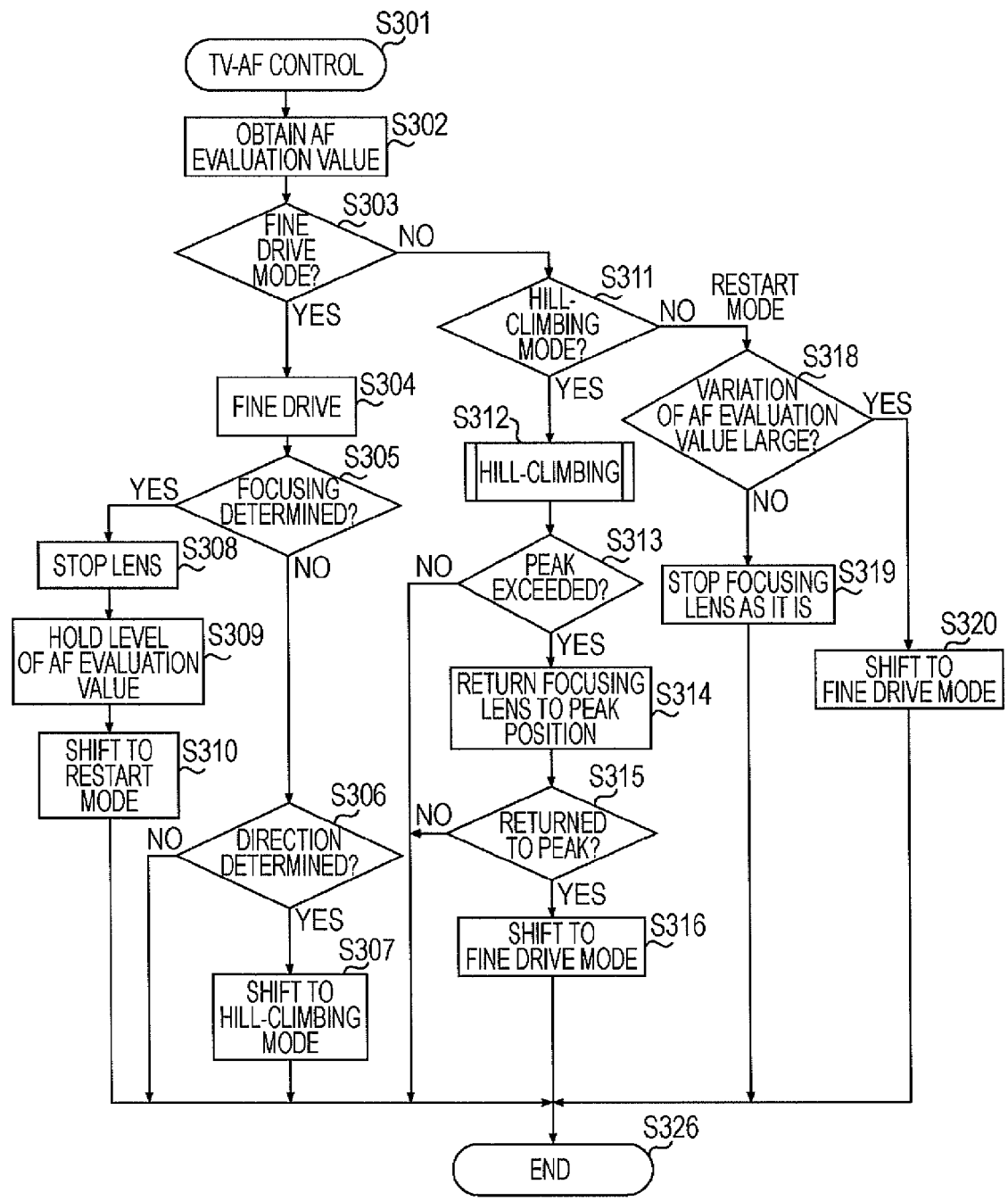
FIG. 3 is a flowchart of a TV-AF control process.

The TV-AF control in Step 202 will now be described with reference to FIG. 3. In Step 301, processing is started. In Step 302, the AF evaluation value detected by the AF signal processing circuit 114 is obtained. In Step 303, it is determined whether the current mode of operation is a fine drive mode. If the mode is the fine drive mode, the processing advances to Step 304. If otherwise, the processing advances to Step 311.

In Step 304, a fine drive operation is performed to determine whether the focusing lens is at the in-focus point. If the focusing lens is not at the in-focus point, it is further determined in which direction the in-focus point is positioned relative to the current position. Details of the fine drive operation will be described later with reference to FIG. 4.

In Step 305, it is determined whether exact focusing can be determined. If exact focusing can be determined, the processing advances to Step 308 in which the lens is stopped. The AF evaluation value at the in-focus point is then held in Step 309. Further, in Step 310, the mode is shifted to a restart mode. Then the process ends at Step 326.

If the focusing is determined in Step 305 to be not yet completed, the processing advances to Step 306. In Step 306, it is determined if the direction in which the in-focus point is positioned can be determined in the fine drive mode. If the direction of the in-focus point can be determined, the processing advances to Step 307 for a shift to a hill-climbing mode. Then the process ends at Step 326. If the direction of the in-focus point cannot be determined, the AF operation is continued in the fine drive mode. Then the process ends at Step 326.

In Step 311, it is determined whether the current mode is the hill-climbing mode. If the mode is the hill-climbing mode, the processing advances to Step 312. If otherwise, the processing advances to Step 318 upon judgment that the mode is in the restart mode.

In Step 312, the focusing lens is moved by hill-climbing drive at a predetermined speed. Details of hill-climbing operation will be described later with reference to FIG. 5. In Step 313, it is determined whether the AF evaluation value has exceeded a peak in the hill-climbing mode. If a peak is exceeded, the processing advances to Step 314. If the peak is not exceeded, the AF operation is continued in the hill-climbing mode. Then the process ends at Step 326.

In Step 314, the focusing lens is returned to the focusing lens position where the AF evaluation value has taken a peak value during the operation in the hill-climbing mode. In Step 315, it is determined whether the focusing lens has been returned to the focusing lens position corresponding to the peak of the AF evaluation value. If the focusing lens has been returned, the processing advances to Step 316 for a shift to the fine drive mode. Then the process ends at Step 326. If the focusing lens is not yet returned, the operation for returning the focusing lens to the focusing lens position corresponding to the peak of the AF evaluation value is continued in the hill-climbing mode. Then the process ends at Step 326.

If the current mode is determined in Step 311 to be not the hill-climbing mode, the processing advances to Step 318 upon judgment that the mode is in the restart mode. In Step 318, the AF evaluation value having been held in Step 309 is compared with the latest AF evaluation value, and it is determined whether a variation of the AF evaluation value is large. If the variation of the AF evaluation value is large, the processing advances to Step 320 for a shift to the fine drive mode. Then the process ends at Step 326. If the AF evaluation value is not varied, the processing advances to Step 319 in which the focusing lens is stopped as it is. Then the process ends at Step 326.

Figure 4:
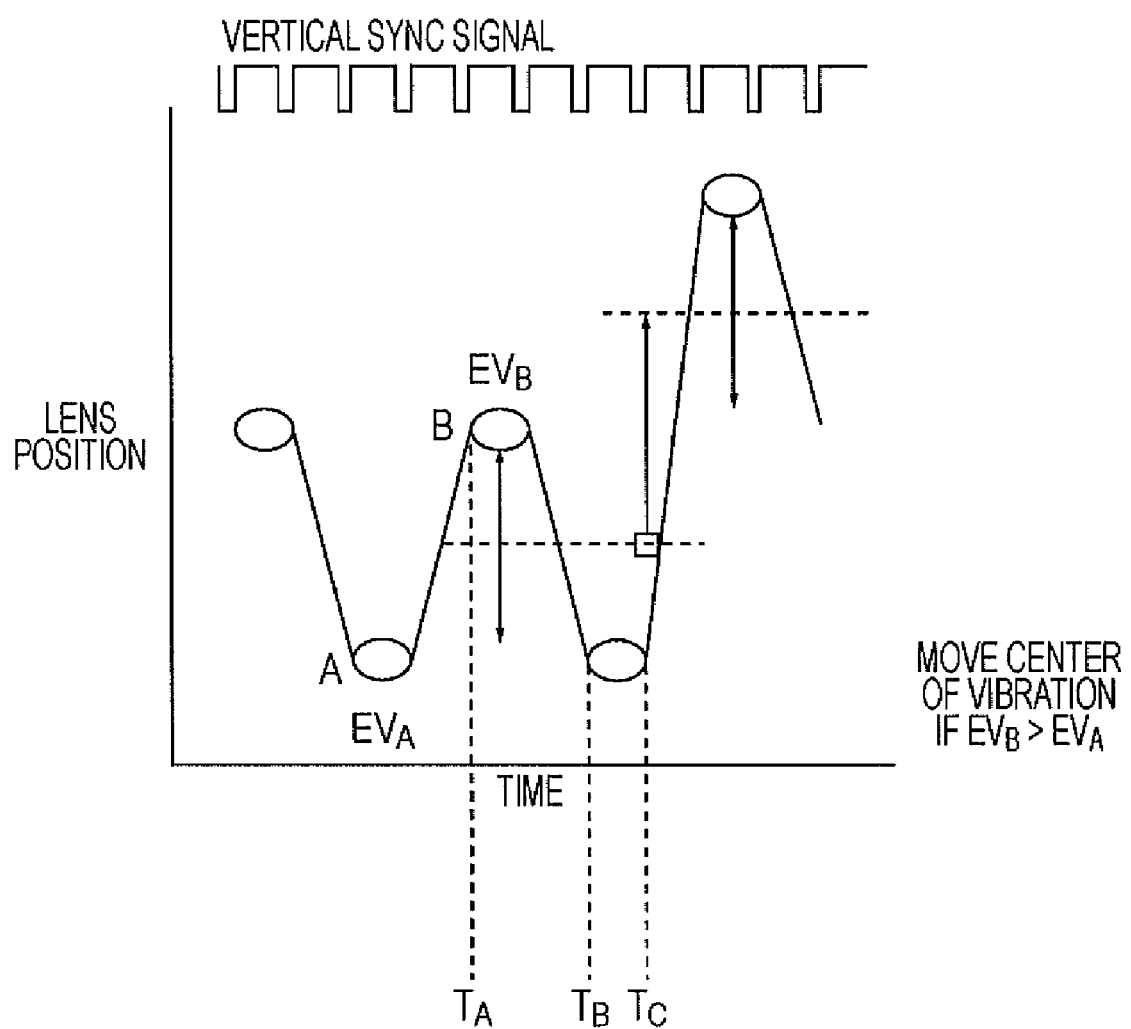
FIG. 4 is a diagram for explaining fine drive.

The operation in the fine drive mode will now be described with reference to FIG. 4. FIG. 4 illustrates the operation of the focusing lens in the fine drive mode with respect to time. In FIG. 4, the horizontal axis represents time, and the vertical axis represents the position of the focusing lens. The pulse train shown at the top of the figure represents a vertical sync signal for an image signal. An AF evaluation value $EV_A$ for charges (indicated by an ellipse) accumulated in the CCD during a period A is taken in at a time $T_A$. An AF evaluation value $EV_B$ for charges (indicated by an ellipse) accumulated in the CCD during a period B is taken in at a time $T_B$. The AF evaluation values $EV_A$ and $EV_B$ are compared with each other at a time $T_C$. If $EV_B > EV_A$, a vibration center is shifted (driving amplitude=vibration amplitude+amplitude of center shift). On the other hand, if $EV_A > EV_B$, the vibration center is not shifted (driving amplitude=vibration amplitude). Thus, the operation in the fine drive mode is performed to find a lens position where the AF evaluation value is maximized, while moving the vibration center. When the direction of shift of the vibration center is determined to be the same a predetermined number of times in succession, that direction is determined to be the focusing direction toward the in-focus position. This determination result is used in Step 206 of FIG. 2 to determine whether the direction toward the focusing lens in-focus position based on the phase difference is the same as the direction of movement of the focusing lens in the TV-AF control operation. Also, the above determination result is used in the TV-AF control, i.e., in Step 306 of FIG. 3, to determine whether the mode is to be shifted to the hill-climbing mode.

Figure 5:
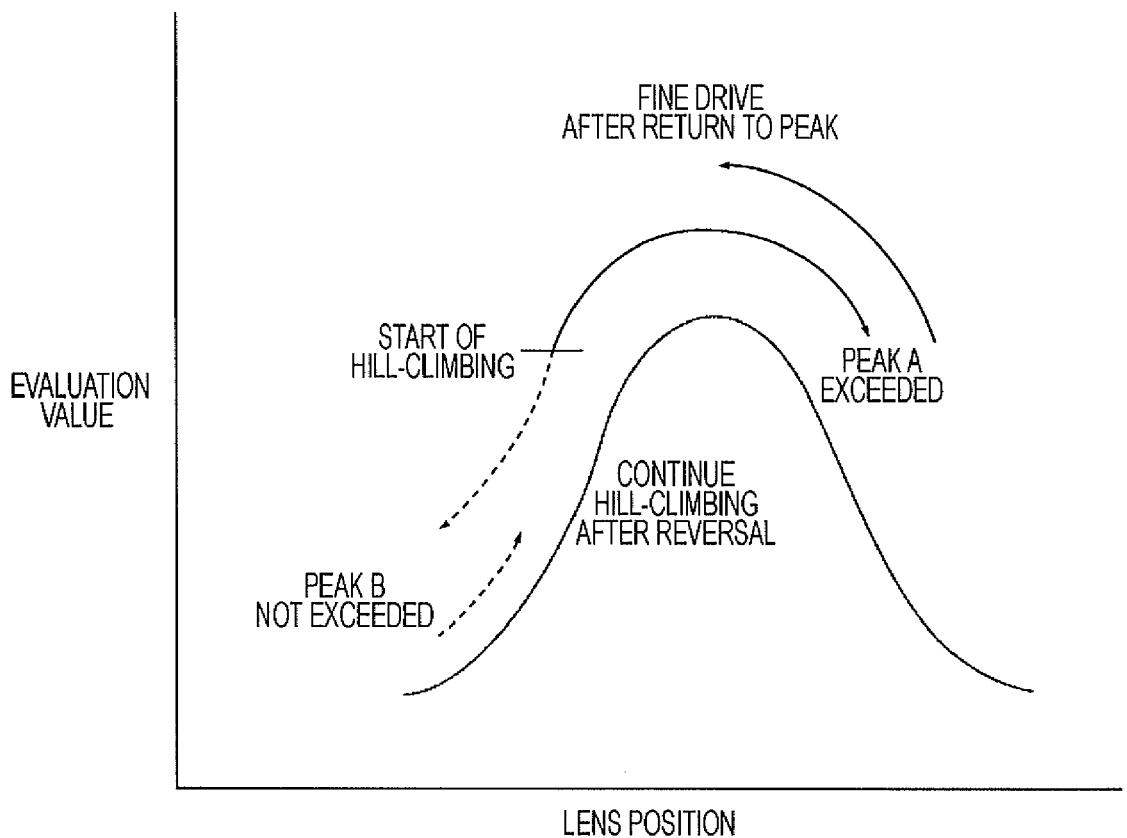
FIG. 5 is a diagram for explaining hill-climbing drive.

The operation in the hill-climbing mode will now be described with reference to FIG. 5. In the hill-climbing mode, the focusing lens is driven at a high speed to find a peak in the AF evaluation value on the basis of the AF evaluation value at that time. FIG. 5 shows the movement of the lens during the operation in the hill-climbing mode. In FIG. 5, A represents the case where the AF evaluation value exceeds the peak and is then reduced. This means the presence of the in-focus point in the preceding stroke. Therefore, the focusing lens is returned to the peak position, and the operation in the hill-climbing mode is brought to an end, followed by shifting to the fine drive mode. On the other hand, B represents the case where the AF evaluation value is continuously reduced without exceeding a peak. This means that the focusing lens is moved in a wrong direction. Therefore, the operation in the hill-climbing mode is continued after reversing the direction of movement of the focusing lens.

According to the first embodiment, as described above, whether to move the focusing lens toward the focusing lens in-focus position based on the phase difference is determined in accordance with the result of comparing the direction of the lens movement toward the focusing lens in-focus position based on the phase difference and the direction of movement of the focusing lens in the TV-AF control. Consequently, unnecessary movement of the focusing lens to the focusing lens in-focus position based on the phase difference can be avoided, and the AF operation causing image blurring or hunting can be prevented.

In particular, the above-described technique of the first embodiment can solve the problem that, in the AF operation for motion pictures which are continuously recorded even during the AF operation, a motion causing a viewer to feel awkward is recorded.

Second Embodiment

Figure 6:
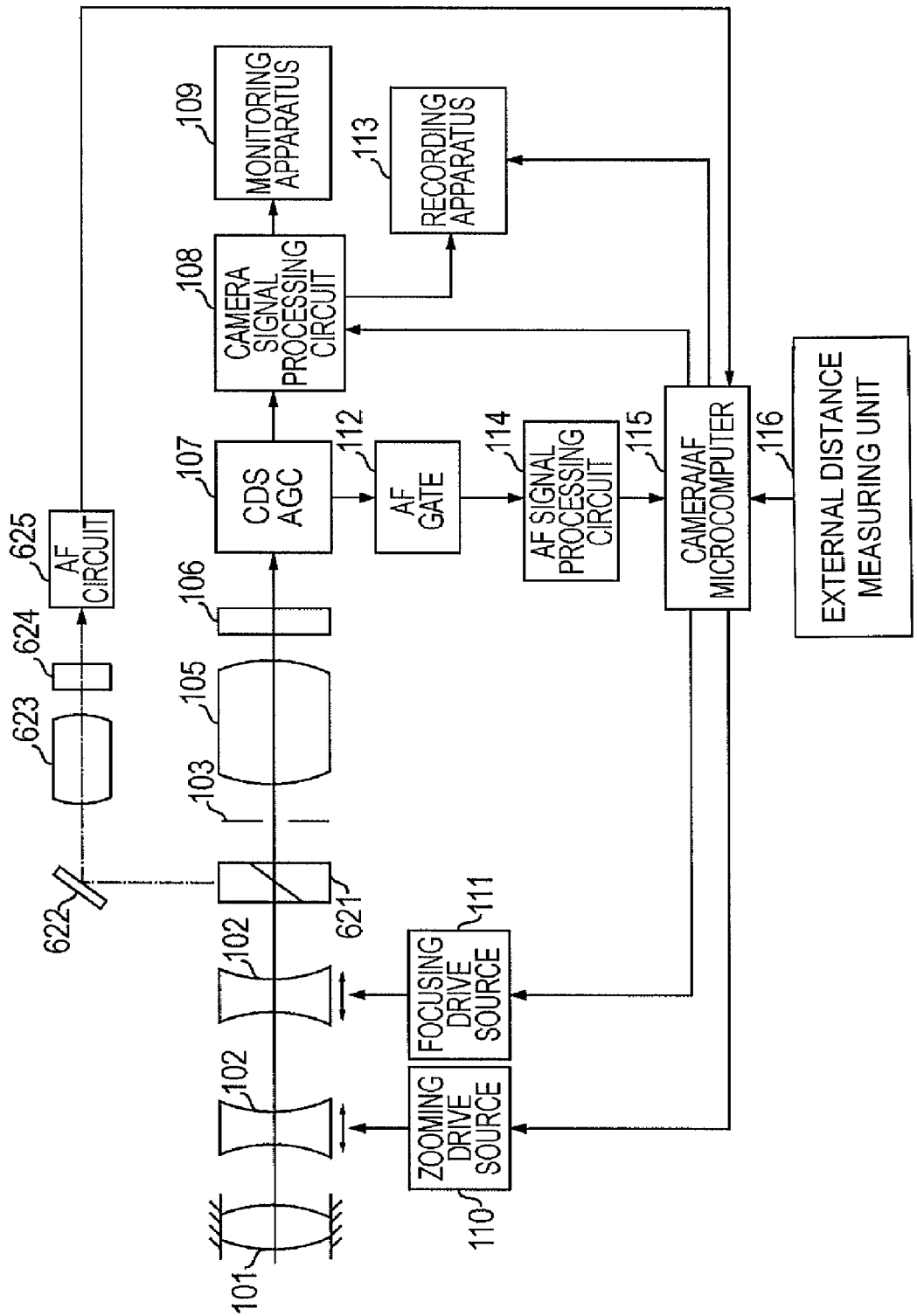
FIG. 6 is a block diagram of a video camera according to a second embodiment of the present invention.
Figure 7:
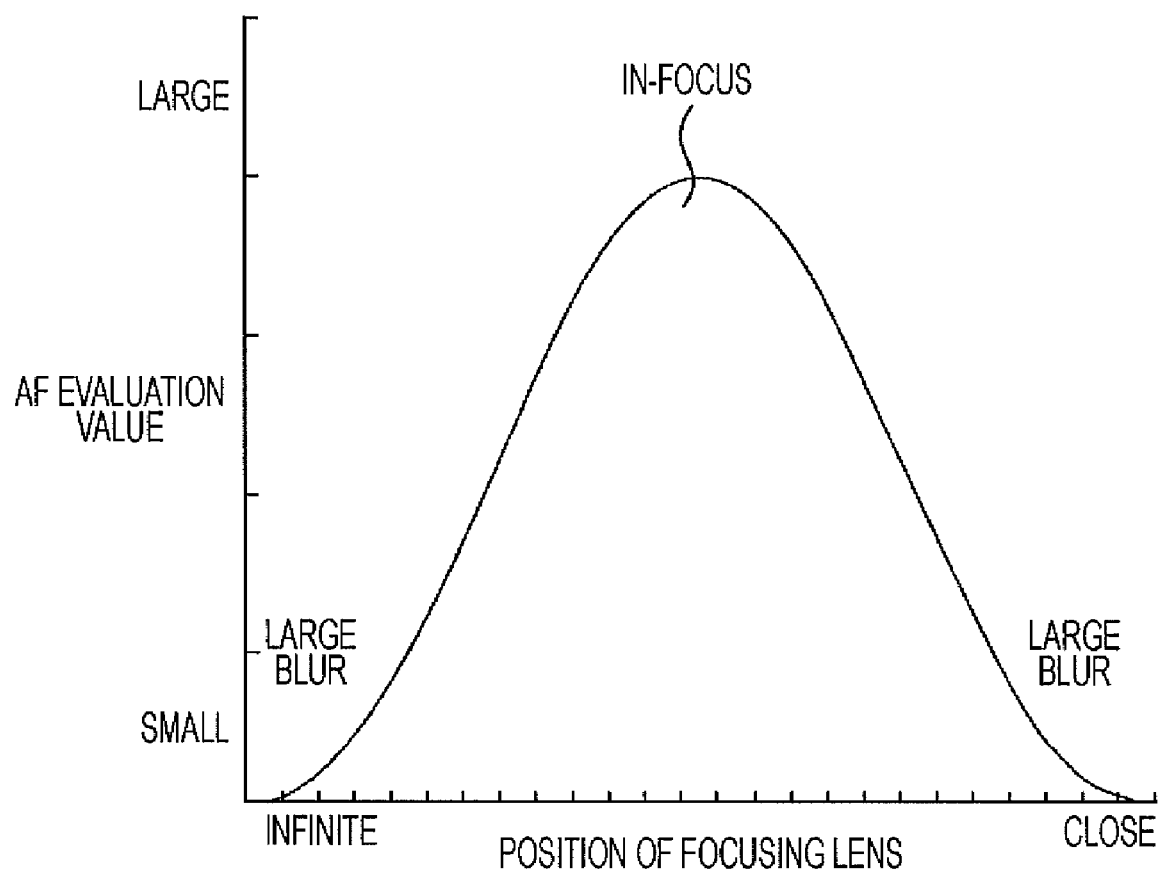
FIG. 7 is a graph for explaining the relationship between an AF evaluation value obtained by the TV-AF technique and the in-focus position of a focusing lens.

FIG. 6 is a block diagram showing the system configuration of an image pickup apparatus according to a second embodiment of the present invention. In this second embodiment, components common to the first embodiment are denoted by the same reference numerals as those in the first embodiment, and a description of such components is not repeated here. While the first embodiment employs the external distance measuring unit, the second embodiment utilizes the TTL phase-difference detection technique.

The image pickup apparatus according to the second embodiment includes a half prism 621 which divides a light beam for autofocusing (AF), a sub-mirror mirror 622, and an imaging lens 623 for the AF. Reference numeral 624 denotes a focus detection sensor of the phase-difference detection type, and 625 denotes an AF circuit.

The camera AF microcomputer 115 detects the amount and the direction of a focal deviation based on a signal output from the focus detection sensor 624 through the AF circuit 625.

In an image pickup apparatus having the above-described construction, because the aperture 103 is actually working during picking-up of motion pictures, input light has to be divided by the half prism 621 forward of the aperture 103.

Figure 2:
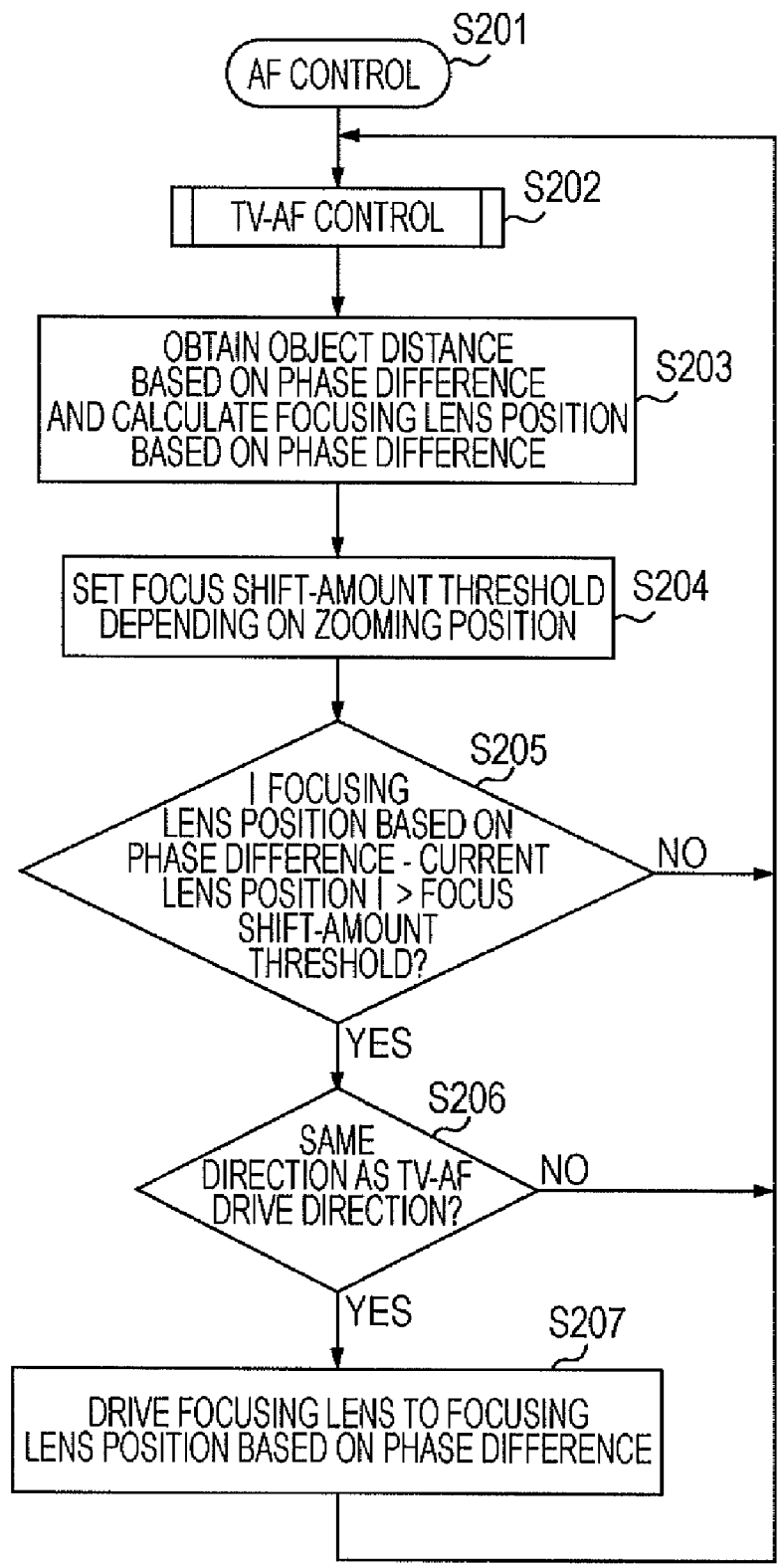
FIG. 2 is a flowchart of an AF control process.

In the second embodiment, the internal phase-difference detection technique is used instead of the external distance measurement technique, and the amount and the direction of a focal deviation are detected instead of the object distance in Step 203 of FIG. 2 which has been described in the first embodiment. Therefore, the AF control algorithm described in the first embodiment is also applicable to the second embodiment.

More specifically, in Step 203 in the flowchart of FIG. 2, the amount and the direction of a focal deviation are detected and the focusing lens in-focus position based on the phase difference is calculated from the detected results.

In Step 206, a comparison is made to determine whether the direction of focal deviation and the direction of movement of the focusing lens in the TV-AF control are the same.

As described above, even when the internal phase-difference detection technique is used instead of the external distance measurement technique, a similar advantage to that in the first embodiment can be obtained by determining whether the focusing lens is to be moved to the focusing lens in-focus position based on the phase difference. That determination is made in accordance with the result of comparing the direction of movement of the focusing lens toward the focusing lens in-focus position based on the internal phase-difference detection and the direction of driving of the focusing lens in the TV-AF control operation.

Other Embodiments

In the above embodiments, the focus adjusting means using the sharpness of the image moves the focusing lens to the position determined by the other in-focus position measuring means if the direction of movement required by the two means agrees. As an alternative embodiment it would be possible to adapt the apparatus so that is only moved part way in this direction. Also if it is determined that the directions are different, it is possible that rather than not moving the focusing lens at all the focus adjusting means is adapted to move the focusing lens only a small distance in the direction determined by the other in-focus position measuring means.

The processing described in the above embodiments may be realized by providing a storage medium, storing program codes of software realizing the above-described functions, to a programmable system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like, can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-237588, filed on Sep. 1, 2006, which is hereby incorporated by reference herein in its entirety.

What is claimed is:

1. A focus adjustment apparatus comprising:
 a moving unit configured to move a focusing lens;
 a focus adjusting unit configured to perform focus adjustment by moving the focusing lens such that the sharpness of an image obtained from an image pickup unit is increased; and
 an in-focus position measuring unit configured to measure an in-focus position in a different manner from the focus adjusting unit,
 wherein the focus adjusting unit moves the focusing lens in the direction of the in-focus position measured by the in-focus position measuring unit when the direction of movement of the focusing lens in which image sharpness is increased is matched with the direction of the current position of the focusing lens relative to the in-focus position measured by the in-focus position measuring unit, and either does not move the focusing lens in the direction of the in-focus position measured by the in-focus position measuring means, or does not move the lens all the way to the in-focus position measured by the in-focus position measuring means, when both directions are not matched with each other.

2. The focus adjustment apparatus according to claim 1, wherein the movement of the focusing lens to the in-focus position measured by the in-focus position measuring unit is performed faster than the movement of the focusing lens by the focus adjusting unit without using the measurement result of the in-focus position measuring unit.

3. The focus adjustment apparatus according to claim 1, wherein the in-focus position measuring unit measures the in-focus position based on a phase difference between a pair of light beams from an object.

4. An image pickup apparatus comprising:
the focus adjustment apparatus according to claim 1; and
an image pickup unit configured to pick up an object image.

5. A control method for a focus adjustment apparatus including a moving unit configured to move a focusing lens, a focus adjusting unit configured to perform focus adjustment by moving the focusing lens such that sharpness of an image obtained from an image pickup unit picking up an object image is increased, and an in-focus position measuring unit configured to measure an in-focus position in a different manner from the focus adjusting unit, the control method comprising:
moving the focusing lens to the in-focus position measured by the in-focus position measuring unit if the direction of movement of the focusing lens in which image sharpness is increased is matched with the direction of the current position of the focusing lens relative to the in-focus position measured by the in-focus position measuring unit; and
not moving the focusing lens to the in-focus position measured by the in-focus position measuring unit when both the directions are not matched with each other.

* * * * *